United States Patent Office 3,231,514
Patented Jan. 25, 1966

3,231,514
REGENERATION OF AND PRODUCTION OF ADDITIONAL ALUMINA FROM ALUMINUM HALIDE-ALUMINA CATALYST
Clifton N. Sechrist, Texas City, Tex., Joe T. Kelly, Lake Charles, La., and William Schoen, Houston, Tex., assignors to Standard Oil Company, Chicago, Ill., a corporation of Indiana
No Drawing. Filed May 8, 1962, Ser. No. 193,298
9 Claims. (Cl. 252—414)

This invention relates to solid particulate aluminum halide-adsorbent support catalyst and processes utilizing such catalyst. More particularly, the invention relates to a method for producing aluminum oxide-base suitable for use as a cocatalytic adsorbent support.

The aluminum halides have been used as catalysts for conversions of organic compounds for many years. Aluminum halides per se are inconvenient to use as catalysts because of special difficulties encountered with addition of the catalyst and good contacting of the catalyst with the reactants. In order to obviate some of these difficulties, aluminum halide catalysts have been used in conjunction with complex forming materials such as hydrocarbons which produce liquid complexes possessing catalytic activity. These liquid complexes have introduced other problems. Another form in which aluminum halide has been utilized has been as a so-called solid catalyst wherein aluminum halide is positioned on the surface of a particulate adsorbent aluminum oxide-base cocatalyst material such as alumina or bauxite. These solid aluminum halide-adsorbent catalysts have been particularly used where continuous flow operation is desired. For example, a commercial operation on the isomerization of n-butane utilizes such a catalyst consisting of aluminum trichloride positioned on activated bauxite of about 4–8-mesh size.

These solid aluminum halide-adsorbent catalysts lose activity during the course of the reaction and eventually are discarded when the activity of the "used catalyst" has reached the level at which further use is uneconomical. The aluminum halides are expensive materials; frequently the adsorbent materials are even more expensive. Attempts have been made, unsuccessfully, to develop methods whereby the used catalyst might be returned to a more active condition. Thus there is a need for a method whereby the support which is the major portion of the catalyst composition can be recovered for further use.

An object of the invention is a method for producing aluminum oxide-base suitable for use as a cocatalyst. Another object is a method fror treating an aluminum halide-aluminum oxide-base catalyst, which has become less active by use in hydrocarbon conversion, to recover aluminum oxide-base suitable for use as a cocatalyst. A particular object is a method of producing aluminum oxide-base suitable for use as a cocatalyst from a used solid particulate catalyst consisting essentially only of aluminum halide positioned on an aluminum oxide-base cocatalyst material. Other objects will become apparent in the course of the detailed description of the invention.

It has been discovered that aluminum oxide-base suitable for use as a cocatalyst can be recovered from used catalyst of the type consisting essentially only of aluminum halide positioned on an aluminum oxide-base cocatalyst. The recovery is accomplished by solvolyzing the aluminum halide present therein with water, alcohols, ketones, ethers, or a mixture of these; separating the resultant liquid-solid mixture; and calcining the separated solid portion at a temperature from about 500 to about 1100° F. for a time sufficient to reduce the volatile matter content of the solid below about 6 weight percent, as measured by loss on ignition at 1832° F. Additional aluminum oxide-base cocatalyst material can be produced during this process from the aluminum halide present in the used catalyst by adjusting the pH of the liquid-solid mixture either during or after completion of the solvolysis to within the range of about 4 to about 11. The precipitated aluminum hydroxide is converted to aluminum oxide in admixture with the recovered original aluminum oxide-base material.

The "used catalyst" is defined as one possessing less catalytic activity than fresh catalyst of this type, which loss in activity has resulted from use in a hydrocarbon conversion process. The used catalyst may be derived from any of the processes involving a hydrocarbon feed which are catalyzed by aluminum halides and, particularly, by solid catalysts of the type hereinafter defined. The used catalyst from conversions involving saturated hydrocarbons is particularly amenable to the cocatalyst recovery method of the invention. A suitable source of used catalyst is the isomerization of lower molecular weight paraffins and cycloparaffins, namely, paraffinic hydrocarbon having from 4 to 8 carbon atoms which can be rearranged, and cycloparaffins containing from 6 to 9 carbon atoms which can be rearranged. Some isomerization processes require the presence of a cycloparaffin inhibitor, in which case the hydrocarbon feed may contain not only the defined lower molecular weight paraffins but also cycloparaffins containing from 5 to 9 carbon atoms. Used catalyst from alkylation of isobutane with ethylene, propylene, and/or butenes can also be used in the recovery process of the subject invention.

The fresh catalyst charged to the hydrocarbon conversion process consists essentially only of an aluminum halide positioned on an aluminum oxide-base cocatalyst material. A preferred aluminum halide is aluminum trichloride. The amount of aluminum halide positioned on the cocatalyst adsorbent material will be dependent upon the properties of the adsorbent material, the particular halide used, the particular hydrocarbon conversion process to be catalyzed, and the adsorbent itself.

A fresh catalyst may be prepared by any of the processes known to the art—for example, by subliming aluminum trichloride vapors onto the cocatalyst adsorbent material; or by contacting the adsorbent material with a hydrocarbon solution of aluminum trichloride until the desired amount of trichloride has been adsorbed therefrom; or molten aluminum trichloride may be admixed with the cocatalyst material. A particularly suitable catalyst for isomerization reactions is prepared by a dry-mix procedure wherein solid aluminum trichloride and the adsorbent material are intermingled and the mix contacted with liquid hydrocarbon until the cocatalyst adsorbent has positioned thereon the desired amount of aluminum trichloride.

The method of the invention comprises treating the defined used catalyst with a liquid capable of solvolyzing the aluminum halide present therein. A sufficient quantity of liquid to form a liquid-solid mixture is used. Generally this will be a greater quantity of liquid than would be necessary to solvolyze the aluminum halide present in the catalyst since the aluminum oxide-base is a highly adsorbent material. Sufficient solvolyzing liquid to form a separate liquid phase is used so that extraneous materials which may be released from the catalyst during the process of solvolysis will be withdrawn with the liquid during the separation of the liquid-solid mixture.

Suitable solvolyzing liquids are water, alcohols, ketones, and ethers. Preferred solvents for the solvolysis of aluminum halide are water and the aliphatic alcohols, ketones, and ethers. Illustrative solvolyzing compounds are: water, methanol, ethanol, 1-propanol, 2-butanol, 2-methyl-2-propanol, 1-pentanol, 3-pentanol, 3-methyl-1-butanol, 1,2- ethanediol, 1,2,3-propanetriol, 1-hexanol, propanone, butanone, 2-pentanone, 3-methyl-2-butanone, 3-pentanone, 3-methyl-2 - pentanone, methoxymethane, methoxyethane, ethoxyethane, 1 - ethoxypropane, 2 - ethoxypropane, 1-propoxypropane, 2 - isopropoxypropane, methoxybutane, and ethoxyisobutane. Their reaction products are soluble and readily hydrolyzed or removed from the aluminum oxide-base. The aliphatic solvents are preferably saturated. Olefinic compounds in the solvolysis mixture tend to polymerize and to form high molecular weight compounds and complexes which are difficult to remove from the ficult to remove from the aluminum oxide-base material. aluminum oxide-base material.

Water is convenient to use alone. It hydrolyzes the aluminum halide directly to form aluminum hydroxide and hydrogen halide. The aluminum hydroxide remains in solution in the excess water due to the low pH caused by the dissolved hydrogen halide produced. The aluminum hydroxide may be precipitated by raising the pH as hereinafter described.

Water may not react completely with the aluminum halide present in some used catalysts because of its high surface tension and immiscibility with hydrocarbon present. Because of this, it is advantageous to use a mixture of water and another solvent such as alcohol, ketone, and/or ether. It is preferred, but not necessary, to use those solvents which are appreciably miscible with water. It is therefore preferable to use those solvents which have not more than 6 carbon atoms per molecule. These solvents easily solvolyze essentially all of the aluminum halide present in the used catalyst.

The compounds formed when alcohols, ketones, and ethers react with aluminum halide are thought to be complexes. These complexes will react with water to form aluminum hydroxide. The compounds formed when any of these anhydrous solvents is added to the catalyst are soluble in the liquid phase. They can therefore be removed from the solid aluminum oxide-base when the liquid-solid mixture is separated, or they can be hydrolyzed and the resulting aluminum hydroxide precipitated by adjusting the pH of the solution to within the range of 4 to 11.

If it is desired to recover only the aluminum oxide-base present in the used catalyst, the products of solvolysis may be left in solution and removed with the solvent. Any aluminum hydroxide which tends to precipitate may be put into solution by addition of acid to lower the pH below about 4, preferably to within the pH range of 1 to 3. Preferable acids are hydrochloric, hydrobromic, and sulfuric.

Not only can existing aluminum oxide-base be recovered but also additional cocatalytic base can be produced from the used catalyst. This is done by solvolyzing the aluminum halide and precipitating the aluminum hydroxide from solution in the presence of the aluminum oxide-base component of the used catalyst, separating the solid from the resulting liquid-solid mixture and calcining the separated solid portion. The aluminum hydroxide is converted to aluminum oxide-base during calcination. The calcination is carried out at 500 to 1100° F., preferably at about 900 to 1000° F. for a time sufficient to reduce the volatile matter content below about 6 weight percent, as measured by loss on ignition at 1832° F.

When aluminum hydroxide is to be precipitated, sufficient water must be present in the solvolyzing solution to convert the solvolysis products which contain aluminum to aluminum hydroxide. The aluminum hydroxide is caused to precipitate by adjusting the pH of the solution to within the range of 4 to 11. This is best done by addition of a base to the solution. Bases such as alkali metal hydroxides may be used. However, ammonia, anhydrous or aqueous, is a preferred base because it forms soluble salts and contains no metals which might adsorb onto the aluminum oxide-base and act as catalyst poisons.

Aqueous ammonia (ammonium hydroxide) is a convenient base to use with the alcohol, ketone, and/or ether solvents. The water present in the ammonium hydroxide solution will ordinarily be sufficient to convert the solvolysis products which contain aluminum to aluminum hydroxide.

A preferred catalyst for hydrocarbon conversions, broadly considered, is an aluminum halide positioned on an aluminum oxide-base cocatalyst. Aluminum trichloride ($AlCl_3$) is a preferred aluminum halide. The term "aluminum oxide-base cocatalyst" includes the various aluminum materials—natural and synthetic—and the various bauxitic and aluminous materials wherein aluminum oxide is present in admixture or combination with silicon dioxide and/or other metal oxide, such as bauxite, laterite, fuller's earths, synthetic silica-alumina, and synthetic magnesia-alumina. (These aluminum oxide-base cocatalysts are not significantly active for hydrocarbon isomerization, yet when conjoined with $AlCl_3$ produce more hydrocarbon isomerization than does the same amount of $AlCl_3$ alone, i.e., at the same process conditions.)

"Alumina materials" herein include not only the $Al_2O_3$-form but also the alumina hydrates, amorphous aluminas, and gel aluminas. The $Al_2O_3$-form includes corundum, tabular alumina, and alpha alumina. The alumina hydrates include the monohydrates (Boehmite and diasbore); the trihydrates (gibbsite and bayerite), those "hydrates" containing water intermediate these two forms; and those "hydrates" containing less water than the monohydrate amount as, for example, in the nearly anhydrous gamma, eta, and chi aluminas. The synthetic alumina hydrates such as amorphous aluminas, gel aluminas, and silica stabilized gel aluminas are particularly good sources of cocatalytic aluminum oxide-base. The aluminas mentioned above contain substantially only aluminum oxide and hydrate water.

The bauxitic materials which are naturally occurring impure alumina hydrates, such as bauxite and laterite, are a particularly good source of aluminum oxide-base cocatalyst. These bauxitic materials may contain alumina monohydrates, for example, European bauxites; or they may contain alumina trihydrate, for example, North American, South American, and East Indian bauxites. $Al_2O_3$ is the predominant component; iron oxide is present—as much as 25 weight percent; silica as $SiO_2$ (or as an inorganic silicate, such as kaolinite) is present; titanium dioxide is usually another more-or-less major component; other materials in more-or-less minor amounts are present. The bauxites may be used as a source of cocatalyst as produced in the mine; or they may be treated to reduce the iron oxide content, the silica content, or the titanium dioxide content. It is desirable to reduce the alkali metal oxide content.

The aluminous materials which contain substantial amounts, or even large amounts, of oxides other than aluminum oxide may be suitable for use in the process when conjoined with aluminum halide. Materials which contain silicon dioxide (wherein the $SiO_2$ is present as such or in combination with the aluminum oxide—and water) along with aluminum oxide and hydrate water may be cocatalyst aluminum oxide-bases. The synthetic material known as silica-alumina, which is used as a hydrocarbon cracking catalyst, is such a suitable aluminous material. Another such aluminous material is fuller's earth.

A significant degree of cocatalytic activity requires the presence of aluminum oxide-base having a substantial amount of surface area. To a degree, catalyst activity (i.e., when both halide and base are present) is increased as the surface area of the aluminum oxide-base is increased.

It is preferred to use the "activated alumina hydrate-containing materials" (such as derived from aluminas and bauxitic materials) as the aluminum oxide-base in the catalyst. These activated materials are obtained by driving off some of the water present in the alumina hydrate materials. The surface area of the activated material increase, to a point, as the "hydrate" water content decreases. Maximum catalyst activity does not necessarily coincide with maximum surface area; "hydrate" water content also appears to be important in increasing the activity of the catalyst. It is probable that each source of activated material has its own optimum relation of surface area and "hydrate" water content.

An illustration: An aluminum oxide-base containing virtually only alumina trihydrate was heated to remove "hydrate" water to various contents. The activity of catalyst prepared from these various activated aluminas increased slowly as the water content decreased to that corresponding to the alumina monohydrate form (15%). With further loss of water, the activity increased very rapidly to a plateau-type maximum, which maximum corresponded roughly to the range of aluminas having water content (8%) corresponding to $Al_2O_3 \cdot 0.5H_2O$ and water content (4%) corresponding to $Al_2O_3 \cdot 0.25H_2O$, respectively. Catalyst activity slowly decreased as the water content was further reduced to about 0.25%. Even the very nearly anhydrous alumina containing only 0.03% water gave a very active catalyst.

Another: An Arkansas bauxite containing 31% water (as ignition loss at 1832° F.) was activated and tested for cocatalyst activity. The catalyst activity increased to a plateau maximum in the range of 2 to 5 weight percent water content; the surface area at this range of water content was less than the maximum area obtainable. Maximum surface area was obtained at a water content greater than 5%.

The preferred catalyst consists essentially of an aluminum halide, such as aluminum trichloride, and the aluminum oxide-base cocatalyst. The minimum aluminum halide content of the catalyst to obtain a substantial degree of activity under the conditions of the process varies with the particular aluminum oxide-base and halide used. In general, activity increases with increasing aluminum halide content up to a maximum which depends upon the particular aluminum oxide-base present. More halide may be present than that needed for maximum activity. In general, with aluminum chlorides, the catalyst will contain aluminum chloride in the range of 10 to 60 weight percent. Very broadly, the amount of aluminum trichloride corresponding to maximum catalyst activity is substantially that calculated from the "presence" of a monolayer of planar aluminum trichloride molecules uniformly adhering to the surface of the aluminum oxide-base.

The recovery process can be used with catalyst of any particle size. The adsorbent material may be in the form of extremely fine particles, for example, talc-like character. A range of particle sizes may be present, such as particle sizes may be from about 60 to 300 mesh screen size. Larger size granules or grains suitable for fixed bed operation, such as screen mesh size of 20 to 60 or mesh size of 4 to 8, may be present. The aluminum oxide-base material may be formed into regular shapes, such as pills of various thickness and diameter—for example, ⅛ inch by ¹⁄₁₆ inch or ¼ inch by ⅛ inch—or into spheres of various sizes.

ILLUSTRATIONS

The cocatalyst recovery process is illustrated by the following working examples. In all of these examples, the original fresh catalyst consisted of aluminum trichloride positioned on synthetic activated alumina. The alumina was prepared by calcining aluminum trihydrate at a temperature of 900 to 1000° F. for 16 to 18 hours. The feed hexane was a mixture of hexanes derived from a catalytic reformate. This material had been treated to remove aromatic hydrocarbons and olefins essentially completely. The feed contained 0.1% neohexane. In addition to the paraffins, the feed contained a total of about 10% of cyclopentane, methylcyclopentane, and cyclohexane. The comparisons were made utilizing a batch operation carried out at 122° F. The solid support (aluminum oxide-base) and aluminum trichloride were introduced into the reactor, the liquid feed introduced, and the contents agitated for 3 hours. It was observed that the aluminum trichloride rapidly positioned itself on the solid particles and, to observation, became one single material retaining the free-flowing characteristics of the solid particles themselves. The composition of the hydrocarbon product was determined by gas chromatography and the activity of the catalyst was measured by the neohexane content of the product hexane fraction.

*Example 1*

In this example, a series of experiments was made to show that aluminum oxide-base suitable for use as a cocatalyst can be recovered from an aluminum trichloride-aluminum oxide base catalyst by solvolysis. To produce the original aluminum oxide-base, 100 to 300 mesh size synthetic alpha trihydrate alumina was calcined at 1000° F. for about 16 hours. This base material had a surface area of 144 square meters per gram (sq. m./gm.) and a volatile matter content of 2.2 weight percent, as measured by weight loss upon ignition at 1832° F. Aluminum oxide-base and aluminum trichloride ($AlCl_3$) were slurried in feed hexanes to form the catalyst and isomerize the hexanes under batch conditions. The used catalyst was recovered from the reaction mixture and hydrolyzed to recover the aluminum oxide-base. The recovered base was mixed with fresh $AlCl_3$ and again slurried in feed hexanes to form the catalyst and isomerize the hexanes. These cycles were repeated until the catalyst had been formed, used for isomerization, and the aluminum oxide-base recovered three times.

To produce the fresh catalyst, 20 parts by weight of aluminum trichloride and 80 parts of fresh aluminum oxide-base were placed in a stirred batch reactor. One hundred parts by weight of feed hexane was added and the mixture stirred for 3 hours at 122° F. At the end of the 3-hour reaction period the product hexane fraction contained 45.6 weight percent neohexane.

(1) The used catalyst was recovered from the first conversion cycle and solvolyzed. The amount of water used was 20 mols of water per mol of $AlCl_3$ present in the catalyst (catalyst was 20 weight percent $AlCl_3$). This was sufficient excess water to form a liquid-solid mixture with the used catalyst. The aluminum oxide-base was separated from the liquid-solid mixture by filtration and calcined at 1000° F. for 16 hours. The calcined base material had a surface area of 101 sq. m./gm. and a loss on ignition of 2.0 weight percent. The filtrate had a pH of 1.6 and contained 5.2 weight percent soluble aluminum.

A second isomerization cycle was carried out under the same conditions as the first but using the recovered aluminum oxide-base from the first hydrolysis to form the catalyst. The hexane product from this test contained 47.0 weight percent neohexane. This shows that the recovered aluminum oxide-base was suitable for use as a cocatalyst since the catalyst formed with it was at least as active as the original catalyst.

(2) The used catalyst was recovered from the second conversion cycle and solvolyzed with the filtrate from the first operation. This provided 30 mols of water for each mol of $AlCl_3$ present in the quantity of catalyst used. (Some catalyst had been destroyed during analysis.) The aluminum oxide-base was filtered from the liquid-solid mixture and the filter cake washed with fresh water. The wash water was combined with the filtrate. The separated aluminum oxide-base was calcined as before, after which it had a surface area of 77 sq. m./gm. and a loss on ignition of 1.7 weight percent. The filtrate had a pH of 1.5 and contained 5.7 weight percent dissolved aluminum.

A third isomerization test was carried out using the twice-recovered aluminum oxide-base as cocatalyst. This test was under the same conditions as the previous two tests. The hexane fraction of the product contained 43.2% neohexane.

(3) The catalyst was separated from the third conversion cycle and hydrolyzed with 50 mols of water per mol of AlCl₃ in the used catalyst. The aluminum oxide-base was separated from the third liquid-solid mixture and calcined as before. The recovered aluminum oxide-base had an ignition loss of 1.3 weight percent. The recovered aluminum oxide-base was used for a fourth isomerization test under the same conditions as the previous tests. The hexane product contained 47.3% neohexane.

The above shows that aluminum oxide-base suitable for use as a cocatalyst can be produced from a used catalyst by the process of the subject invention.

*Example II*

In another series of tests, 100 to 300 mesh size synthetic alpha trihydrate alumina was dried and calcined at 900° F. for 18 hours. The resulting fresh aluminum oxide-base had the properties shown in Table I.

An isomerization test using this fresh base was carried out in the same manner as described in Example I. The product hexanes contained 47.8% neohexane. The used catalyst was then separated from the reaction mixture and treated with sufficient water to form a liquid-solid mixture. The solution was controlled at a pH of 6 by addition of aqueous ammonium hydroxide. This pH adjustment caused the soluble aluminum to precipitate from solution as aluminum hydroxide. The solvolysis mass was aged for 24 hours, and then the solids were separated from the liquid, dried at 300° F., and calcined at 900° F. for 18 hours. The properties of the recovered aluminum oxide-base thus produced are listed in the right-hand column of Table I. This method of recovery resulted in a 16 weight percent net increase in available aluminum oxide-base over that present in the used catalyst.

| Properties | Aluminum oxide-base | |
|---|---|---|
| | Fresh | Recovered |
| Pore volume, cc./gm | 0.243 | 0.238 |
| Surface area, sq. m./gm | 174 | 141 |
| Loss on ignition at 1832° F., wt. percent | 3.26 | 3.58 |

A standard isomerization test was then carried out under the same conditions as described in Example I using the recovered aluminum oxide-base as cocatalyst. The hexane product from this test contained 45.2% neohexane. The results of this test series show that by using the process of the subject invention aluminum oxide-base can be recovered, and additional aluminum oxide-base can be produced from the aluminum present in the used catalyst as aluminum halide to produce an aluminum oxide-base suitable for use as a cocatalyst.

Thus, having described the invention, what is claimed is:

1. In the process for the regeneration of an aluminum halide-aluminum oxide-base cocatalyst which catalyst has undergone a decrease in activity during contact with hydrocarbon under conditions to obtain a hydrocarbon conversion reaction and wherein said cocatalyst is contacted with a liquid being selected from the class consisting of water, aliphatic alcohols having from 1 to 6 carbon atoms per molecule, aliphatic ketones having from 3 to 6 carbon atoms per molecule and aliphatic ethers having from 2 to 6 carbon atoms per molecule, whereby the aluminum halide is removed from the cocatalyst by solvation, the improvement comprising providing an aqueous solution of base in the mixture of catalyst and said liquid to adjust the pH thereof to within the range of 4 to 11 so that the aluminum from the aluminum halide is precipitated as aluminum hydroxide, separating the solid portion of the mixture and calcining the separated solid portion at a temperature within the range of 500 to 1100° F. for a time sufficient to reduce the volatile matter content of said solid below about 6 weight percent as measured by loss on ignition at 1832° F., whereby an active aluminum oxide base suitable for use as a cocatalyst having more aluminum oxide than originally present is produced.

2. The method of claim 1 wherein said liquid is water.

3. The method of claim 1 wherein said liquid consists essentially of water in an amount sufficient to convert the aluminum halide to aluminum hydroxide and at least one aliphatic liquid selected from the class consisting of alcohols having from one to six carbon atoms per molecule, ketones having from three to six carbon atoms per molecule, and ethers having from two to six carbon atoms per molecule.

4. The method of claim 1 wherein said pH is adjusted by the addition of ammonia to said liquid-solid mixture.

5. The method of claim 1 wherein said aluminum oxide-base cocatalyst is alumina.

6. The method of claim 1 wherein said aluminum oxide-base cocatalyst is bauxite.

7. The method of claim 1 wherein said hydrocarbon conversion process is paraffin alkylation.

8. The method of claim 1 wherein said hydrocarbon conversion process is paraffin isomerization.

9. The method of claim 1 wherein said separated solid is washed with water prior to calcining.

References Cited by the Examiner

UNITED STATES PATENTS

| 2,254,618 | 9/1941 | McMillan et al. | 252—412 |
| 2,339,685 | 1/1944 | deSimo et al. | 252—420 |
| 3,026,176 | 3/1962 | Tyson et al. | 252—420 |

OTHER REFERENCES

Jacobson, Encyclopedia of Chemical Reactions, Reinhold Publishing Co., N.Y., 1946, volume I, page 80 QD 7353.

MAURICE A. BRINDISI, *Primary Examiner.*